United States Patent
Yim et al.

(10) Patent No.: US 10,762,848 B2
(45) Date of Patent: Sep. 1, 2020

(54) DISPLAY DEVICE AND DRIVING METHOD FOR THE SAME

(71) Applicant: LG Display Co., Ltd., Seoul (KR)

(72) Inventors: Hyunbeen Yim, Paju-si (KR); DoWan Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/242,468

(22) Filed: Jan. 8, 2019

(65) Prior Publication Data

US 2019/0139493 A1    May 9, 2019

Related U.S. Application Data

(63) Continuation of application No. 15/389,020, filed on Dec. 22, 2016, now Pat. No. 10,210,807.

(30) Foreign Application Priority Data

Aug. 31, 2016 (KR) .......................... 10-2016-0112098

(51) Int. Cl.
*G09G 3/3258* (2016.01)
*G09G 3/20* (2006.01)
(Continued)

(52) U.S. Cl.
CPC ......... *G09G 3/3258* (2013.01); *G06F 1/3296* (2013.01); *G09G 3/20* (2013.01);
(Continued)

(58) Field of Classification Search
CPC ................ G06F 1/3265; G06F 1/3234; G09G 2330/021; Y02B 70/16; Y10T 307/696
See application file for complete search history.

(56) References Cited

U.S. PATENT DOCUMENTS 8,018,093 B2    9/2011    Miermont et al.
9,041,626 B2    5/2015    Park et al.
(Continued)

FOREIGN PATENT DOCUMENTS

CN    101425259 A    5/2009
CN    102243841 A    11/2011
(Continued)

OTHER PUBLICATIONS

First Office Action and Search Report, China National Intellectual Property Administration Patent Application No. 201611245114.8, dated Nov. 5, 2019, 24 pages.
(Continued)

*Primary Examiner* — Yuzhen Shen
(74) *Attorney, Agent, or Firm* — Fenwick & West LLP

(57) ABSTRACT

A display device is provided that includes a panel driving circuit configured to control the power supply unit to be disabled in response to a low-power mode and adjust a length of time required for a voltage level applied to high-potential voltage lines to transition from a first high-potential voltage to a second high-potential voltage. Thus, it is possible to suppress display of an abnormal image on a display panel in the low-power mode, and a length of time for transitioning from the normal mode to the low-power mode can be adjusted, and, thus, the brightness of the display panel can be naturally changed.

13 Claims, 14 Drawing Sheets

(51) Int. Cl.
*G09G 3/3208* (2016.01)
*G06F 1/3296* (2019.01)
*G09G 3/3233* (2016.01)

(52) U.S. Cl.
CPC ......... *G09G 3/3208* (2013.01); *G09G 3/3233* (2013.01); *G09G 2310/08* (2013.01); *G09G 2320/0626* (2013.01); *G09G 2320/0633* (2013.01); *G09G 2320/0653* (2013.01); *G09G 2330/02* (2013.01); *G09G 2330/021* (2013.01); *G09G 2330/028* (2013.01); *G09G 2340/0435* (2013.01)

(56) References Cited

U.S. PATENT DOCUMENTS

| | | | |
|---|---|---|---|
| 9,240,138 | B2 | 1/2016 | Seo |
| 9,324,261 | B2 | 4/2016 | Lee |
| 10,056,031 | B2 | 8/2018 | Park |
| 2003/0038792 | A1 | 2/2003 | Murayama et al. |
| 2008/0284407 | A1* | 11/2008 | Miermont ............ G06F 1/3203 323/350 |
| 2009/0109147 | A1 | 4/2009 | Park et al. |
| 2011/0273109 | A1 | 11/2011 | Park |
| 2012/0044231 | A1* | 2/2012 | Park ........................ G06F 1/263 345/211 |
| 2013/0082910 | A1 | 4/2013 | Lee |
| 2013/0113775 | A1 | 5/2013 | Seo |
| 2013/0335396 | A1 | 12/2013 | Kim |
| 2016/0179179 | A1* | 6/2016 | An ........................ G06F 1/3265 345/212 |
| 2016/0189608 | A1 | 6/2016 | Park |
| 2017/0330518 | A1* | 11/2017 | Lee ...................... G09G 3/3291 |

FOREIGN PATENT DOCUMENTS

| | | |
|---|---|---|
| CN | 103035174 A | 4/2013 |
| CN | 103106868 A | 5/2013 |
| CN | 103268754 A | 8/2013 |
| CN | 105741785 A | 7/2016 |
| EP | 1993019 A1 | 11/2008 |
| EP | 2079072 A2 | 7/2009 |
| JP | H11-119877 A | 4/1999 |
| JP | 2005-236520 A | 9/2005 |
| JP | 2008-293490 A | 12/2008 |
| JP | 2009-109984 A | 5/2009 |
| JP | 2009-163196 A | 7/2009 |
| KR | 10-2004-0052356 A | 6/2004 |

OTHER PUBLICATIONS

European Extended Search Report, European Application No. 16206704.5, dated Feb. 6, 2018, 11 pages.
Japanese Office Action, Japanese Application No. 2016-249166, dated Jan. 9, 2018, 5 pages (with concise explanation of relevance).
United States Office Action, U.S. Appl. No. 15/389,020, dated Aug. 13, 2018, 19 pages.
United States Office Action, U.S. Appl. No. 15/389,020, dated Apr. 6, 2018, 19 pages.
Second Office Action and Search Report, China National Intellectual Property Administration Patent Application No. 201611245114.8, dated May 18, 2020, 27 pages.

* cited by examiner

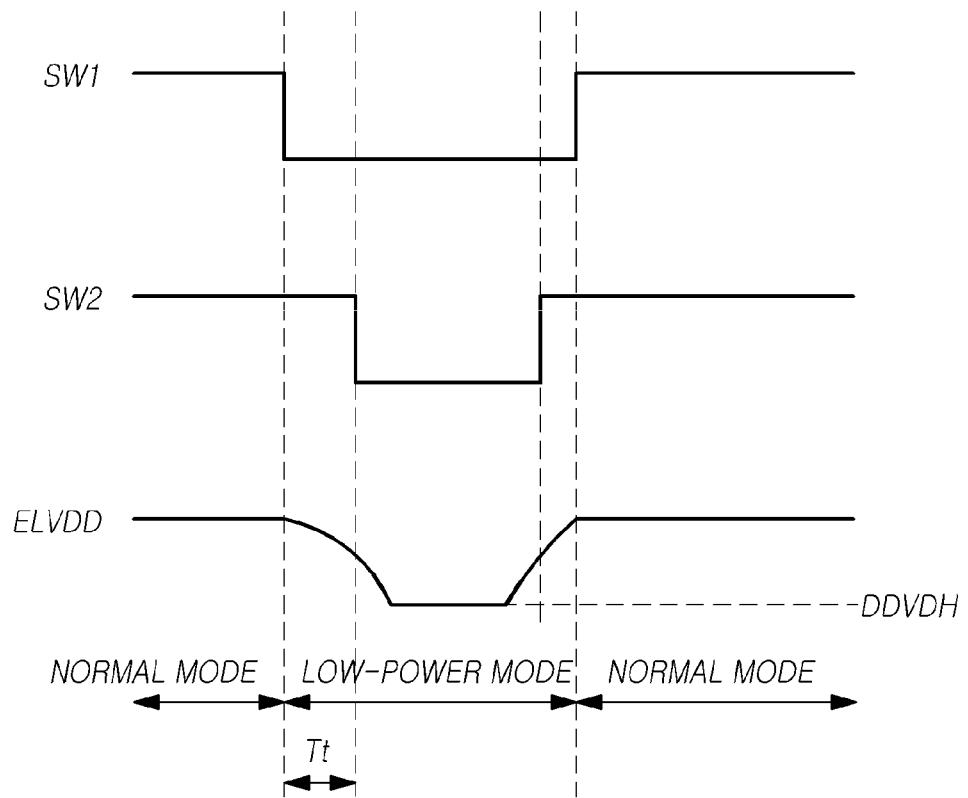

DISPLAY DEVICE AND DRIVING METHOD FOR THE SAME

CROSS-REFERENCE TO RELATED APPLICATIONS

This application is a continuation of U.S. patent application Ser. No. 15/389,020 filed on Dec. 22, 2016 which claims priority from Republic of Korea Patent Application No. 10-2016-0112098, filed on Aug. 31, 2016, each of which is hereby incorporated by reference in its entirety.

BACKGROUND

Field of Technology

The present disclosure relates to a display device and a driving method for the same.

Description of the Related Art

With the development of the information society, various demands for display devices for displaying an image have been increasing. Various types of display devices, such as a liquid crystal display (LCD) device and an organic light emitting display (OLED) device, have been employed in mobile devices.

Such mobile devices are supplied with power from batteries due to their characteristics. Thus, power management may be very important for using the mobile devices for longtime. Accordingly, technologies for driving a display device in a low power mode with low power consumption while being not in use by a user have been developed. However, a LCD device can be brought into a low-power mode by adjusting brightness of the backlight unit, whereas an OLED device uses a self-emitting element and thus cannot adopt the low-power mode adopted by the LCD device. Further, if the low-power mode adopted by the LCD device is applied to the OLED device, there may be a section where an abnormal image is displayed. Accordingly, the development of a method for driving the OLED device in a low-power mode optimized for the OLED device is needed.

SUMMARY

An aspect of the present disclosure provides a display device that can suppress display of an abnormal image in a low-power mode, and a driving method for the display device.

Another aspect of the present disclosure provides a display device that can slowly change the brightness of a displayed image, and a driving method for the display device.

According to an aspect of the present disclosure, there is provided a display device. The display device includes: a display panel including a plurality of gate lines, a plurality of high-potential voltage lines, and a plurality of pixels, each of the plurality of pixels supplied with a gate signal via a corresponding one of the plurality of gate lines that is connected to the pixel, and each of the plurality of pixels supplied with a high-potential voltage that powers the pixel via a corresponding one of the plurality of high-potential voltage lines that is connected to the pixel; a power supply unit connected to the plurality of high-potential voltage lines, the power supply unit enabled in a normal mode and the power supply unit supplying a first high-potential voltage for powering the pixels to the plurality of high-potential voltage lines during the normal mode, and the power supply unit disabled in a low-power mode and the power supply unit not providing the first high-potential voltage to the plurality of high-potential voltage lines during the low-power mode; and a panel driving circuit that disables the power supply unit in response to the low-power mode, the panel driving circuit adjusting a length of time required for a voltage level applied to the plurality of high-potential voltage lines to transition from the first high-potential voltage applied during the normal mode to a second high-potential voltage that is applied to the pixels to power the pixels during the low-power mode, the second high-potential voltage less than the first high-potential voltage.

According to another aspect of the present disclosure, there is provided a display device. The display device includes: a display panel including a plurality of gate lines, a plurality of high-potential voltage lines, and a plurality of pixels, each of the plurality of pixels supplied with a gate signal via a corresponding one of the plurality of gate lines that is connected to the pixel, and each of the plurality of pixels supplied with a high-potential voltage that powers the pixel via a corresponding one of the plurality of high-potential voltage lines that is connected to the pixel; a power supply unit connected to the plurality of high-potential voltage lines, the power supply unit enabled in a normal mode and the power supply unit supplying a first high-potential voltage for powering the pixels to the plurality of high-potential voltage lines during the normal mode, and the power supply unit disabled in a low-power mode and the power supply unit not providing the first high-potential voltage to the plurality of high-potential voltage lines during the low-power mode; and a panel driving circuit that disables the power supply unit in response to the low-power mode, the panel driving circuit establishing a predetermined change of brightness of the display device when transitioning from the normal mode to the low power mode, and the panel driving circuit adjusting a length of time required for a brightness level in the normal mode to transition to a brightness level in the low power mode according to the predetermined changed of brightness.

According to yet another aspect of the present disclosure, there is provided a driving method for a display device. The driving method of the display device includes: applying a first high-potential voltage that powers pixels of the display device to high-potential voltage lines in a normal mode of the display device, the high-potential voltage lines connected to the pixels of the display device; adjusting a voltage applied to the high-potential voltage lines of the display device from the first high-potential voltage applied to the pixels in the normal mode to a second high-potential voltage that is applied to the pixels during the low-power mode that is less than the first high-potential voltage, the voltage adjusted by blocking the first high-potential voltage and applying the second high-potential voltage to the high-potential voltage lines in the low-power mode, and adjusting a length of time required for the voltage level applied to the high-potential voltage lines to transition from the first high-potential voltage applied during the normal mode to the second high-potential voltage that is applied to the pixels to power the pixels during the low-power mode.

According to the present exemplary embodiments described above, it is possible to suppress display of an abnormal image on a display panel in a low-power mode. Further, according to the present exemplary embodiments, a length of a conversion time of converting a normal mode into the low-power mode can be adjusted, and, thus, the brightness of the display panel can be changed naturally.

BRIEF DESCRIPTION OF THE DRAWINGS

The above and other aspects, features and other advantages of the present disclosure will be more clearly understood from the following detailed description taken in conjunction with the accompanying drawings, in which:

FIG. 8 is a timing chart illustrating that a voltage level of a high-potential voltage is changed by an operation of the switch illustrated in FIG. 6 according to the present exemplary embodiment;

DETAILED DESCRIPTION

Figure 1:
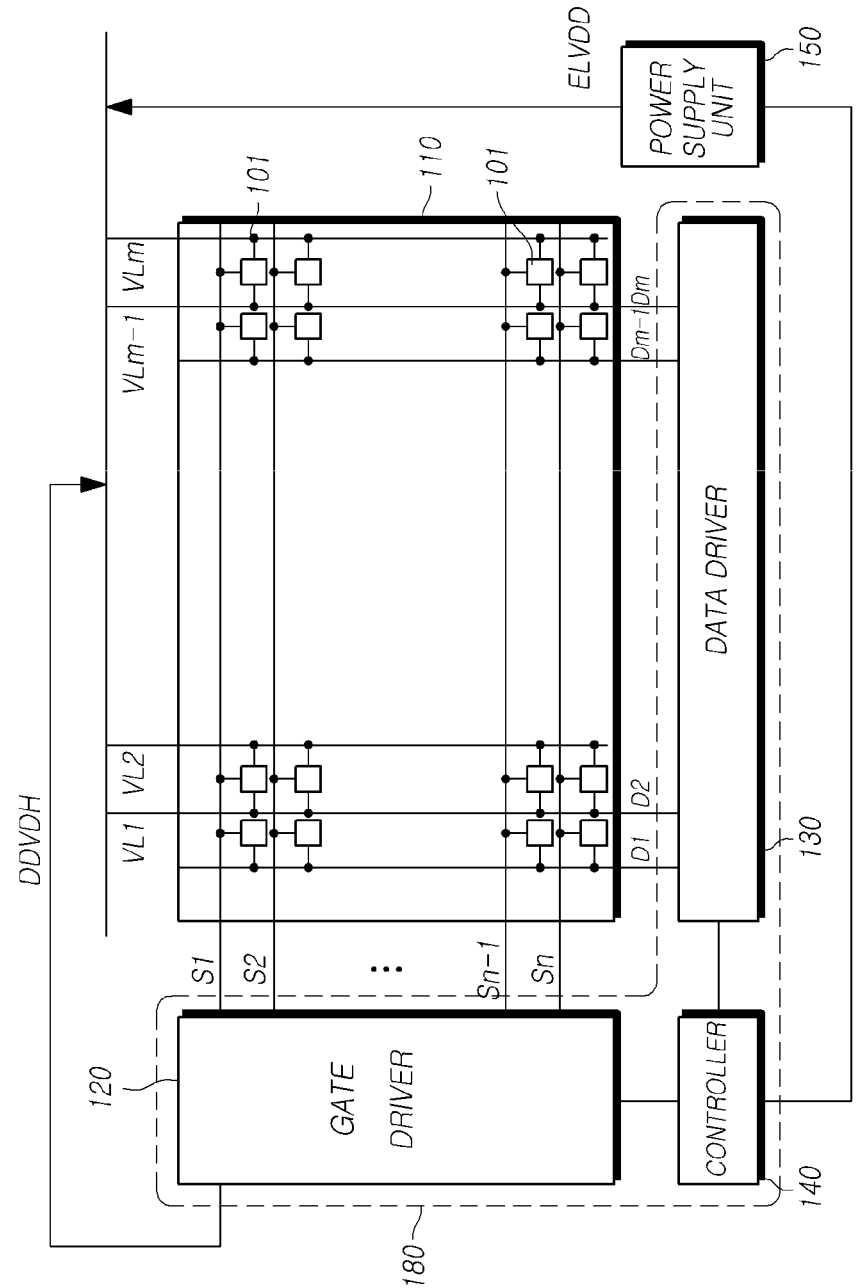
FIG. 1 is a configuration view illustrating a first example of a display device according to an exemplary embodiment.

Hereinafter, some embodiments of the present invention will be described in detail with reference to the accompanying drawings. When reference numerals refer to components of each drawing, although the same components are illustrated in different drawings, the same components are referred to by the same reference numerals as possible. Further, if it is considered that description of related known configuration or function may cloud the gist of the present invention, the description thereof will be omitted.

Further, in describing components of the present invention, terms such as first, second, A, B, (a), and (b) can be used. These terms are used only to differentiate the components from other components. Therefore, the nature, order, sequence, or number of the corresponding components is not limited by these terms. It is to be understood that when one element is referred to as being "connected to" or "coupled to" another element, it may be directly connected to or directly coupled to another element, connected to or coupled to another element, having still another element "intervening" therebetween, or "connected to" or "coupled to" another element via still another element.

FIG. 1 is a configuration view illustrating a first example of a display device according to the present exemplary embodiment.

Referring to FIG. 1, a display device 100 may include a display panel 110, a gate driver 120, a data driver 130, a power supply unit 150, and a controller 140.

The display panel 110 may include a plurality of pixels 101 formed at areas where a plurality of gate lines S1, S2, . . . , Sn−1, Sn, a plurality of data lines D1, D2, . . . , Dm−1, Dm, and a plurality of high-potential voltage lines VL1, VL2, . . . , VLm−1, VLm intersect with each other. Each pixel 101 is illustrated as being connected to a gate line, a data line, and a high-potential voltage line, but is not limited thereto. The pixel 101 may be further connected to an initialization signal line, a light emission signal line, and the like, so as to receive an initialization signal and a light emission signal. Further, the display panel 110 may be driven by a first high-potential voltage ELVDD in a normal mode and may be driven by a second high-potential voltage DDVDH in a low-power mode. A voltage level of the second high-potential voltage DDVDH may be lower than a voltage level of the first high-potential voltage ELVDD, so that power consumed by the display panel 110 in the low-power mode can be reduced. The first high-potential voltage ELVDD may be a voltage generated by the power supply unit 150, and the second high-potential voltage DDVDH may be a voltage for driving the gate driver 120, the data driver 130, and the controller 140.

Further, the normal mode may refer to a mode in which the display device 100 operates according to driving frequencies of 60 Hz and 120 Hz, and the low-power mode may refer to a mode in which the display device 100 operates according to a driving frequency in the range of 7.5 Hz to 50 Hz. Thus, a period of one frame of an image displayed on the display device 100 in the normal mode may be shorter than a period of one frame of an image displayed on the display device 100 in the low-power mode. Therefore, if the display device 100 is driven for the same period of time, a change in image in the low-power mode may be smaller than a change in image in the normal mode. Thus, it is possible to reduce power consumption of the display panel 110 in the low-power mode.

The gate driver 120 may sequentially transfer a gate signal through the plurality of gate lines S1, S2, . . . , Sn−1, Sn. If the gate signal is sequentially transferred to the pixel 101 through the plurality of gate lines S1, S2, . . . , Sn−1, Sn, a data signal to be transferred through the plurality of data lines D1, D2, . . . , Dm−1, Dm may be transferred to the pixel 101. If the pixel 101 receives a light emission signal, the gate driver 120 may supply the light emission signal to the pixel through the light emission signal line. However, the present disclosure is not limited thereto.

The data driver 130 may transfer a data signal through the plurality of data lines D1, D2, . . . , Dm−1, Dm. The data signal transferred through the plurality of data lines D1, D2, . . . , Dm−1, Dm may be transferred to and stored in the pixel 101 to which the gate signal is transferred by the gate driver 120.

The controller 140 may transfer control signals including a vertical synchronization signal Vsync, a horizontal synchronization signal Hsync, and a clock signal clk to the gate driver 120 and the data driver 130 so as to drive the gate driver 120 and the data driver 130. Further, the controller 140 may transfer a data signal to the data driver 130. The controller 140 may separate the normal mode from the low-power mode and transfer the control signals to the gate driver 120 and the data driver 130. Furthermore, the controller 140 may control the power supply unit 150 to be enabled in the normal mode so as to supply the first high-potential voltage ELVDD to the plurality of high-potential voltage lines VL1, VL2, . . . , VLm−1, VLm of the display panel 110 and to be disabled in the low-power mode so as not to supply the first high-potential voltage ELVDD to the display panel 110. The controller 140 may be a timing controller that controls an operation of the display device 100, but is not limited thereto.

The power supply unit 150 may supply the first high-potential voltage ELVDD to the plurality of high-potential voltage lines VL1, VL2, . . . , VLm−1, VLm of the display panel 110. The power supply unit 150 is enabled in the normal mode by the controller 140 so as to transfer the first high-potential voltage ELVDD to the plurality of high-potential voltage lines VL1, VL2, . . . , VLm−1, VLm. However, the power supply unit 150 is disabled in the low-power mode by the controller 140 so as not to transfer the first high-potential voltage ELVDD to the plurality of high-potential voltage lines VL1, VL2, . . . , VLm−1, VLm. If the power supply unit 150 is disabled in the low-power mode, power consumed by the power supply unit 150 can be reduced. Thus, power consumption of the display device 100 can be reduced. Herein, the power supply unit 150 may be a DC-DC converter, but is not limited thereto.

Further, in the display device 100, the gate driver 120, the data driver 130, and the controller 140 may be included in a panel driving circuit 180 manufactured in the form of a chip. Furthermore, the panel driving circuit 180 may receive a panel voltage and then generate the second high-potential voltage DDVDH to be used in the gate driver 120, the data driver 130, and the controller 140 included therein. Also, the panel driving circuit 180 may control the power supply unit 150 to be disabled in the low-power mode so as to supply the second high-potential voltage generated by itself to the display panel 110. Further, the panel driving circuit 180 may control the power supply unit 150 to be disabled and then adjust a time of applying the second high-potential voltage generated by itself to the plurality of high-potential voltage lines VL1, VL2, . . . , VLm−1, VLm. Further, when the normal mode is converted into the low-power mode, the panel driving circuit 180 may adjust a length of a conversion time required to convert the normal mode into the low-power mode. Herein, the length of the conversion time may refer to a time required for the first high-potential voltage ELVDD supplied to the plurality of high-potential voltage lines VL1, VL2, . . . , VLm−1, VLm to reach the second high-potential voltage DDVDH. The panel driving circuit 180 may change a time for a voltage level applied to the plurality of high-potential voltage lines VL1, VL2, . . . , VLm−1, VLm to reach from a voltage level of the first high-potential voltage ELVDD to a voltage level of the second high-potential voltage DDVDH by adjusting the length of the conversion time. The panel driving circuit 180 may change a time for a voltage level applied to the plurality of high-potential voltage lines VL1, VL2, . . . , VLm−1, VLm to reach from a voltage level of the first high-potential voltage ELVDD to a voltage level of the second high-potential voltage DDVDH by adjusting the length of the conversion time. Therefore, the conversion from the normal mode into the low-power mode is not performed suddenly, but performed naturally. Thus, the brightness displayed on the display device 100 can be changed naturally, so that when the normal mode is converted into the low-power mode, display of an abnormal image can be suppressed.

Also, the panel driving circuit 180 may set a brightness change value of the display panel 110 and adjust a brightness change time of changing a brightness in the normal mode to a brightness in the low-power mode when the normal mode is converted into the low-power mode. That is, when the normal mode is converted into the low-power mode, a brightness change value is applied to a brightness change time so as to change the brightness displayed on the display panel 110 according to the brightness change value. Thus, when the normal mode is converted into the low-power mode, display of an abnormal image can be suppressed.

Figure 2:
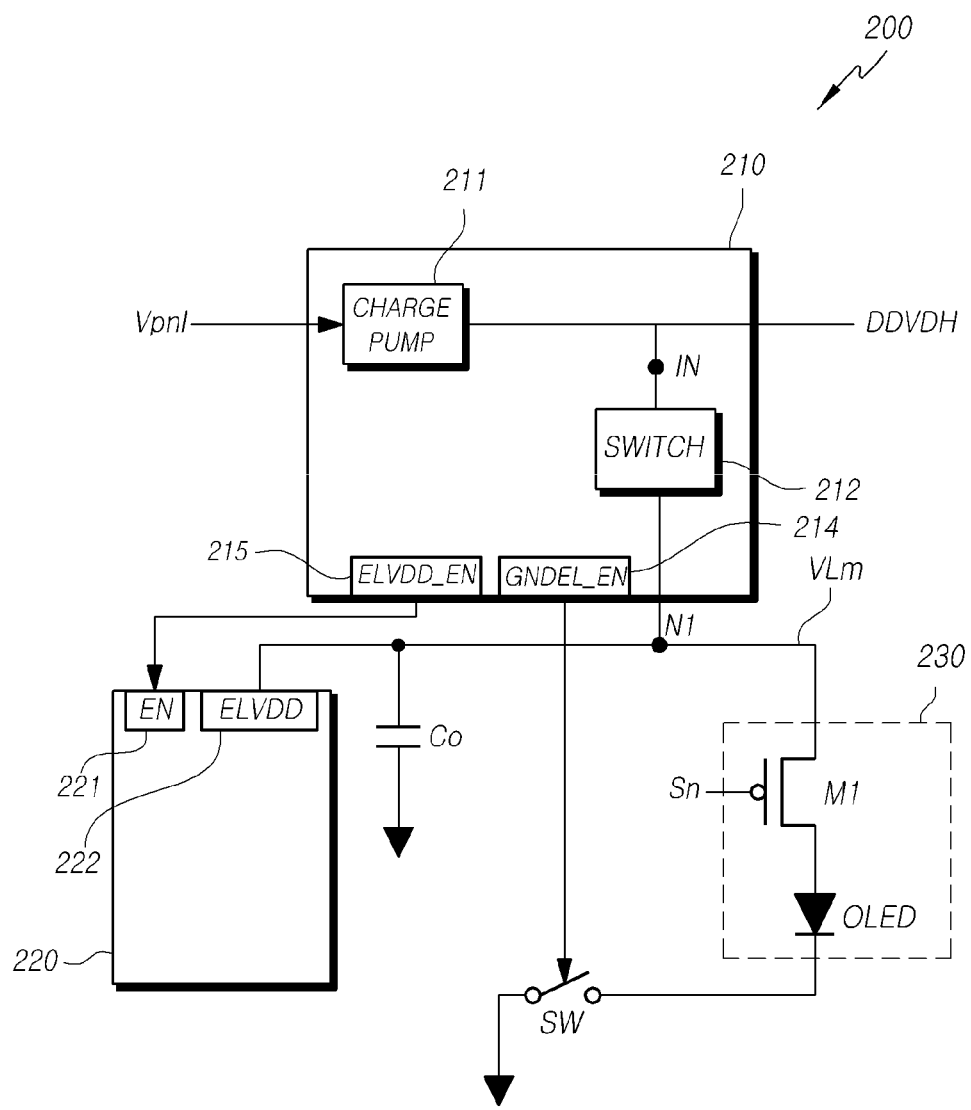
FIG. 2 is a configuration view illustrating a second example of a display device according to the present exemplary embodiment.

FIG. 2 is a configuration view illustrating a second example of a display device according to the present exemplary embodiment.

Referring to FIG. 2, a display device 200 may include a display panel 230, a power supply unit 220, and a panel driving circuit 210.

The display panel 230 may include a pixel which is supplied with a scan signal and a high-potential voltage through a gate line Sn and a high-potential voltage line VLm. Herein, the display panel 230 is illustrated as having a passive matrix structure, but is not limited thereto, and may have an active matrix structure. Further, only one pixel is illustrated for convenience in explanation, and the display panel 230 may include a plurality of pixels. Further, the pixel included in the display panel 230 may be a pixel illustrated in FIG. 4, but is not limited thereto.

The power supply unit 220 is connected to a high-potential voltage line VLm of the display panel 230, and may be enabled in a normal mode to supply a first high-potential voltage ELVDD to the high-potential voltage line VLm and may be disabled in a low-power mode. The power supply unit 220 includes an enable terminal 221, and when the enable terminal 221 is supplied with an enable signal from the panel driving circuit 210, the power supply unit 220 is enabled and thus may supply the first high-potential voltage ELVDD to a high-potential voltage line VL through an output terminal 222 of the display panel 230. Further, when the enable terminal 221 is not supplied with an enable signal or supplied with a disable signal from the panel driving circuit 210, the power supply unit 220 is disabled and thus may not supply the first high-potential voltage ELVDD to the high-potential voltage line VLm of the display panel 230.

The panel driving circuit 210 may control the power supply unit 220 to be disabled corresponding to the low-power mode and supply a second high-potential voltage DDVDH to the high-potential voltage line VLm to convert the normal mode into the low-power mode. When the normal mode is converted into the low-power mode, the panel driving circuit 210 may adjust a conversion time of converting the first high-potential voltage ELVDD supplied to a high-potential voltage line VLm into the second high-potential voltage DDVDH and thus change a time for a voltage level applied to the high-potential voltage line VLm to reach from a voltage level of the first high-potential voltage ELVDD to a voltage level of the second high-potential voltage DDVDH. A time for the voltage level of the first high-potential voltage ELVDD to reach the voltage level of the second high-potential voltage DDVDH can be changed by supplying a current from the second high-potential voltage DDVDH to the high-potential voltage line VLn. Thus, even if the first high-potential voltage ELVDD is blocked, a voltage applied to the high-potential voltage line VLm is not immediately lowered.

The panel driving circuit 210 may include a charge pump 211 that outputs the second high-potential voltage DDVDH by adjusting a panel input voltage Vpnl.

Further, the panel driving circuit 210 may include a switch 212 that selects at least one of a plurality of paths and adjusts the amount of current flowing from the panel driving circuit 210 to the high-potential voltage line VLm. The switch 212 may select one path to allow a small amount of current to flow to the high-potential voltage line VLm, and may select two paths to allow a great amount of current to flow to the high-potential voltage line VLm. If the switch 212 selects one path to decrease the amount of current flowing therethrough, a time for a voltage level of the high-potential voltage line VLm to decrease is increased. Thus, it is possible to increase a length of a conversion time of converting the voltage level of the first high-potential voltage ELVDD into the voltage level of the second high-potential voltage DDVDH. If the length of the conversion time is increased too much, there is no voltage applied to the high-potential voltage line VLm. Thus, the voltage level of the high-potential voltage line VLm may be lower than the voltage level of the second high-potential voltage DDVDH. In order to solve this problem, the switch 212 may further select another one of the plurality of paths to increase the amount of current flowing to the high-potential voltage line VLm and thus decrease the conversion time. Further, the conversion time may be adjusted by adjusting a timing for the switch 212 to further select another path after the switch 212 selects one path. Thus, another path is further selected before the voltage level of the high-potential voltage line VLm becomes lower than the voltage level of the second high-potential voltage DDVDH by monitoring a voltage of the high-potential voltage line VLm. Therefore, it is possible to suppress the voltage level of the high-potential voltage line VLm from being increased after being lower than the voltage level of the second high-potential voltage DDVDH. Thus, it is possible to suppress the occurrence of a glint on the display panel 230.

Further, the first high-potential voltage ELVDD supplied from the power supply unit 220 has a higher voltage level than the second high-potential voltage DDVDH supplied from the panel driving circuit 210. Since a low voltage is used in the low-power mode, power consumption can be further reduced.

Figure 3A:
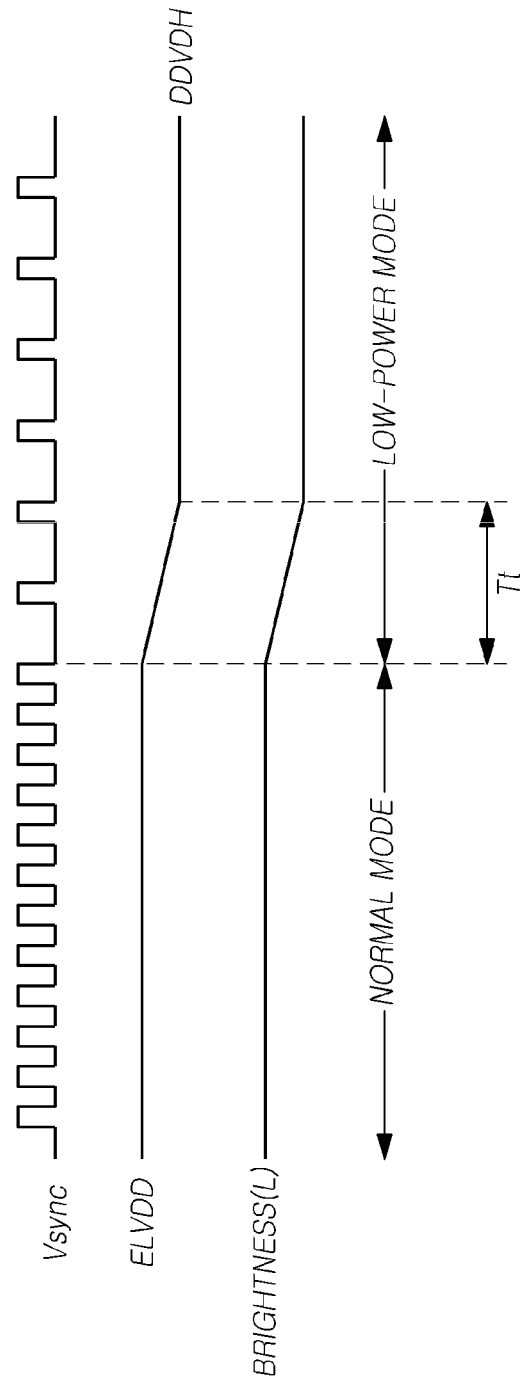
FIG. 3A is a timing chart illustrating a first example of a process of converting a normal mode into a low-power mode in the display device illustrated in FIG. 2 according to the present exemplary embodiment.
Figure 3B:
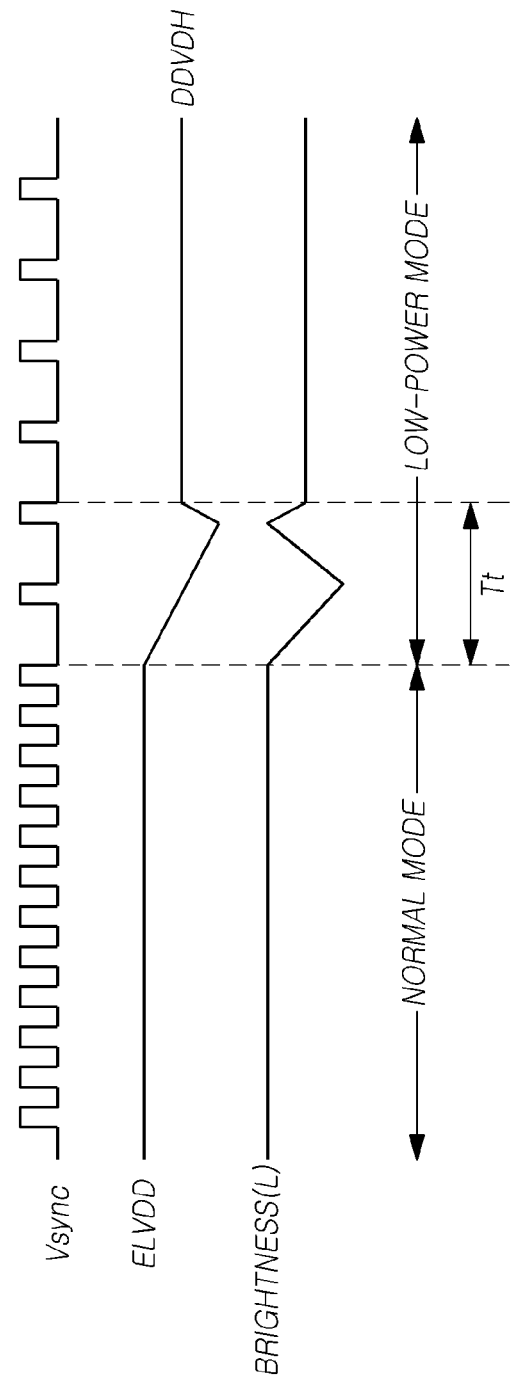
FIG. 3B is a timing chart illustrating a second example of a process of converting a normal mode into a low-power mode in the display device illustrated in FIG. 2 according to the present exemplary embodiment.

FIG. 3A is a timing chart illustrating a first example of a process of converting a normal mode into a low-power mode in the display device illustrated in FIG. 2, and FIG. 3B is a timing chart illustrating a second example of a process of converting a normal mode into a low-power mode in the display device illustrated in FIG. 2 according to an exemplary embodiment.

Referring to FIG. 3A and FIG. 3B, a vertical synchronization signal may be generated corresponding to a frequency of 60 Hz or 120 Hz in a normal mode. Herein, in the normal mode, the power supply unit 220 is enabled and supplies the first high-potential voltage ELVDD to the high-potential voltage line VLm of the display panel 230. The brightness of the display panel 230 measured in the normal mode may correspond to light emission of each pixel at the highest gray scale. The display panel 230 may be maintained at a uniform brightness in the normal mode. A vertical synchronization signal may be generated corresponding to any one frequency in the range of 7.5 Hz to 60 Hz in a low-power mode.

If the normal mode is converted into the low-power mode, the power supply unit 220 is disabled so as not to output the first high-potential voltage ELVDD. Further, the panel driving circuit 210 may apply the second high-potential voltage DDVDH to the high-potential voltage line VLm and may change a time for the voltage level of the high-potential voltage line VLm to reach the voltage level of the second high-potential voltage DDVDH by using the switch 212.

More specifically, if the panel driving circuit 210 selects one of the plurality of paths and reduces the amount of current flowing therethrough by using the switch 212, a time for the voltage level of the high-potential voltage line VLm to decrease is increased. Thus, it is possible to increase a length of a conversion time Tt of converting the voltage level of the first high-potential voltage ELVDD into the voltage level of the second high-potential voltage DDVDH. In order to suppress the length of the conversion time Tt from being increased too much and thus suppress the voltage level of the high-potential voltage line VLm from being lower than the voltage level of the second high-potential voltage DDVDH, another one of the plurality of paths may be selected by the switch 212 to increase the amount of current flowing to the high-potential voltage line VLm and thus decrease the length of the conversion time Tt. Further, the length of the conversion time Tt may be adjusted by adjusting a timing for the switch 212 to further select another path after the switch 212 selects one path. That is, another path is further selected before the voltage level of the high-potential voltage line VLm becomes lower than the voltage level of the second high-potential voltage DDVDH by monitoring a voltage of the high-potential voltage line VLm. Therefore, the voltage level of the high-potential voltage line VLm can be slowly decreased from the voltage level of the first high-potential voltage ELVDD to the voltage level of the second high-potential voltage DDVDH, as illustrated in FIG. 3A. Thus, it is possible to suppress the occurrence of a glint in an image displayed on the display panel 230. The switch 212 is set to monitor a voltage of the high-potential voltage line VLm so as to be slowly decreased from the voltage level of the first high-potential voltage ELVDD to the voltage level of the second high-potential voltage DDVDH when the normal mode is converted into the low-power mode in each display panel 230, so that it is possible to determine a length of the conversion time. Herein, the slope of the line representing the brightness L with respect to the conversion time Tt may correspond to a brightness change value.

However, if the panel driving circuit 210 does not apply the second high-potential voltage DDVDH to the high-potential voltage line VLm immediately after the power supply unit 220 is disabled but applies the second high-potential voltage DDVDH to the high-potential voltage line VLm after a lapse of a predetermined period of time, the voltage level of the high-potential voltage line VLm becomes lower than the voltage level of the second high-potential voltage DDVDH since the second high-potential voltage DDVDH is not applied, and when the second high-potential voltage DDVDH is applied to the high-potential voltage line VLm, the voltage level of the high-potential voltage line VLm is increased again, as illustrated in FIG. 3B. Thus, there is a moment where the brightness of an image displayed on the display panel 230 is decreased and then increased again, resulting in a glint in the image displayed on the display panel 230. Therefore, the conversion time Tt cannot be adjusted and the second high-potential voltage DDVDH needs to be immediately applied to the high-potential voltage line VLm.

Figure 4:
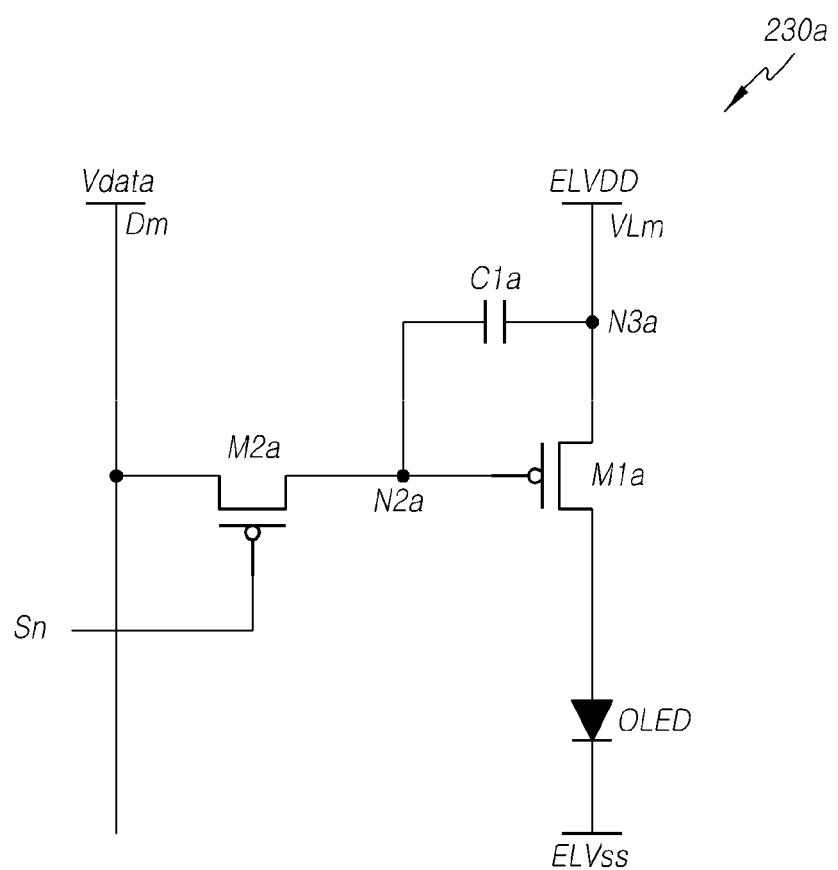
FIG. 4 is a circuit diagram illustrating an exemplary embodiment of a pixel employed in the display device illustrated in FIG. 2 according to the present exemplary embodiment.

FIG. 4 is a circuit diagram illustrating an exemplary embodiment of a pixel employed in the display device illustrated in FIG. 2.

Referring to FIG. 4, a pixel 230a may include a pixel circuit including an OLED, a first transistor M1a, a second transistor M2a, and a capacitor C1a and configured to control a current flowing through the OLED. Herein, the first transistor M1a may be a driving transistor that drives a current flowing through the OLED. A low-potential voltage ELVSS may be grounded. However, the present disclosure is not limited thereto.

A first electrode of the first transistor M1a may be connected to a high-potential voltage line VLm to which a high-potential voltage ELVDD is transferred, and a second electrode may be connected to an anode of the OLED. Further, a gate electrode may be connected to a second node N2a. Furthermore, the first transistor M1a may enable a current to be driven in a direction from the first electrode toward the second electrode in response to a voltage difference between the first electrode and the gate electrode.

A first electrode of the second transistor M2a may be connected to a data line Dm and a second electrode may be connected to the second node N2a. Further, a gate electrode may be connected to a gate line Sn. The second transistor M2a may transfer a data voltage Vdata corresponding to a data signal transferred through the data line Dm to the second node N2a in response to a voltage of a gate signal transferred through the gate line Sn.

The capacitor C1a may be connected between the second node N2a and a third node N3a and may maintain a constant voltage between the gate electrode and the first electrode of the first transistor M1a.

The first electrodes of the respective transistors may be drain electrodes and the second electrodes may be source electrodes. However, the present disclosure is not limited thereto. Further, the respective transistors are illustrated as P-MOS transistors, but are not limited thereto and may be N-MOS transistors.

Figure 5:
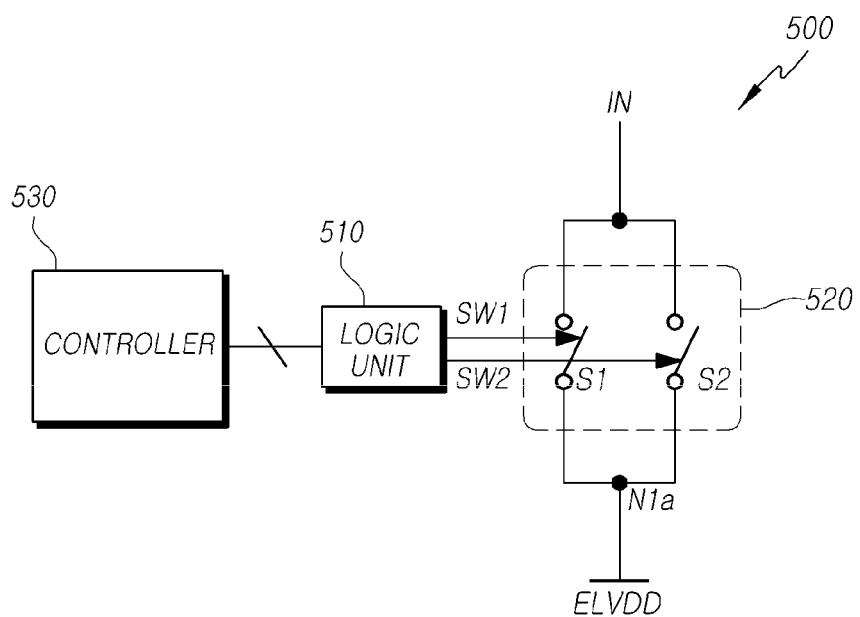
FIG. 5 is a configuration view illustrating a first example of a switch employed in the display device illustrated in FIG. 2 according to the present exemplary embodiment.

FIG. 5 is a configuration view illustrating a first example of a switch employed in the display device illustrated in FIG. 2.

Referring to FIG. 5, a switch 500 may include a first switch S1 configured to be turned on by a first switch signal SW1 so as to transfer a second high-potential voltage DDVDH transferred through an input terminal IN to a high-potential voltage line connected to a first node N1a, a second switch S2 configured to be turned on by a second switch signal SW2 so as to transfer the second high-potential voltage DDVDH to the high-potential voltage line, and a logic unit 510 configured to adjust the amount of current by adjusting a timing for the first switch signal SW1 and the second switch signal SW2 to be output and then outputting the first switch signal SW1 and the second switch signal SW2. The logic unit 510 may be controlled by a controller 530.

As for an operation of the switch 500, when a normal mode is converted into a low-power mode, the first switch S1 is turned on by the first switch signal SW1. When the first switch S1 is turned on by the first switch signal SW1, a path is formed in a direction from the input terminal IN toward the first node N1a and a current flows through the path. Then, while the first switch S1 is turned on by the first switch signal SW1, if the second switch S2 is turned on by the second switch signal SW2, two paths may be formed by the first switch S1 and the second switch S2 in the direction from the input terminal IN toward a first node N1a. The amount of current flowing through each path may be determined by a resistance ratio between the first switch S1 and the second switch S2. If the first switch S1 and the second switch S2 have the same resistance, the currents flowing through the respective paths may be the same in amount. However, if the second switch S2 has a smaller resistance than the first switch S1, the amount of current flowing through the second switch S2 may be greater than the amount of current flowing through the first switch S1. However, when the second switch S2 is also turned on, one more path is added to a case where only the first switch S1 is turned on. Thus, the amount of current flowing toward the first node N1a may be increased. Therefore, when both the first switch S1 and the second switch S2 are turned on, the amount of current flowing toward the first node N1a is increased and a voltage level of the high-potential voltage line VLm may reach a voltage level of the second high-potential voltage more quickly as compared with the case where only the first switch S1 is turned on.

Accordingly, if only the first switch S1 is turned on, the second high-potential voltage DDVDH is applied to the high-potential voltage line VLm connected to the first node N1a, so that the voltage level of the high-potential voltage line VLm reaches the voltage level of the second high-potential voltage from a voltage level of a first high-potential voltage ELVDD. If the voltage level of the high-potential voltage line does not become lower than the voltage level of the second high-potential voltage, only the first switch S1 may be allowed to be turned on, so that a conversion time of converting the first high-potential voltage ELVDD supplied to the high-potential voltage line VLm into the second high-potential voltage DDVDH can be increased. However, the voltage level of the high-potential voltage line VLm may become lower than the voltage level of the second high-potential voltage DDVDH, and the conversion time of converting the first high-potential voltage ELVDD supplied to the high-potential voltage line VLm into the second high-potential voltage DDVDH can be further decreased by adjusting a timing for the second switch S2 to be turned on while the first switch S1 is turned on in order to decrease the conversion time of converting the first high-potential voltage ELVDD supplied to the high-potential voltage line VLm into the second high-potential voltage DDVDH. Thus, it is possible to suppress the voltage level of the high-potential voltage line VLm from being lower than the voltage level of the second high-potential voltage DDVDH. Further, a resistance corresponding to the first switch S1 may be set to be greater than a resistance corresponding to the second switch S2, so that a change in amount of current flowing from the input terminal IN toward the first node N1a may be further increased.

Figure 6:
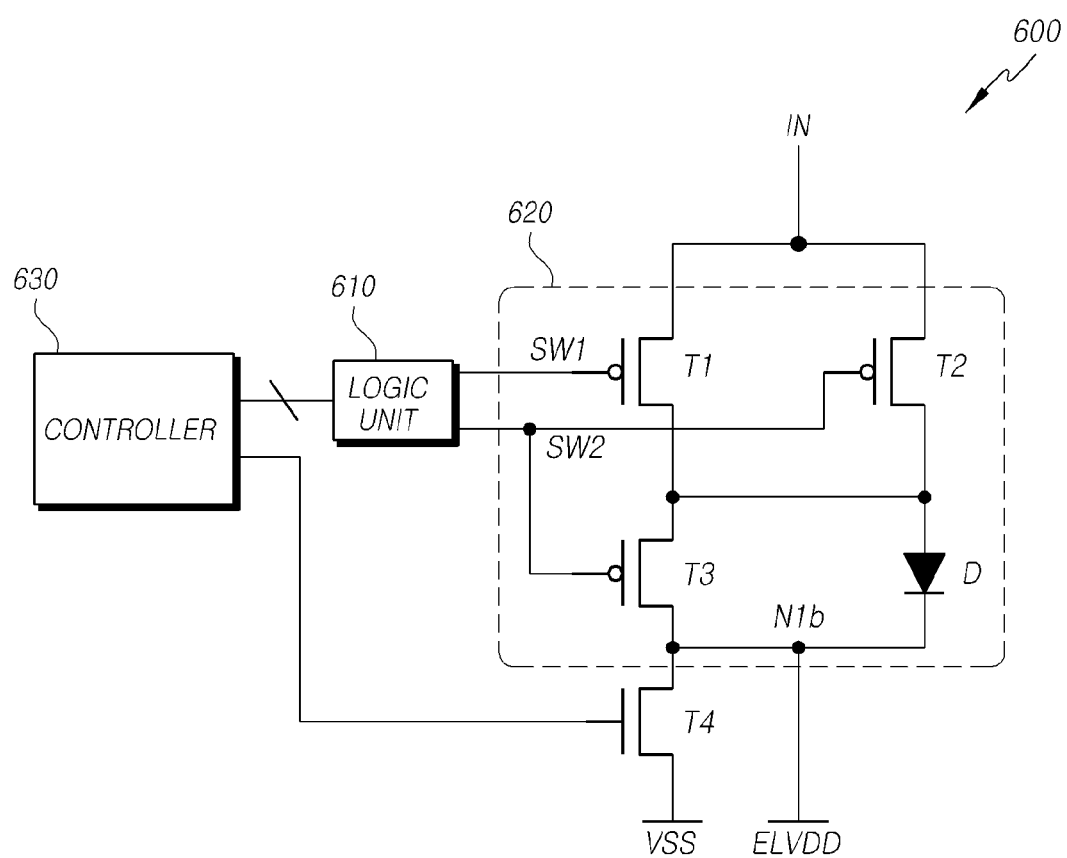
FIG. 6 is a configuration view illustrating a second example of a switch employed in the display device illustrated in FIG. 2 according to the present exemplary embodiment.

FIG. 6 is a configuration view illustrating a second example of a switch employed in the display device illustrated in FIG. 2.

Referring to FIG. 6, a switch 600 may include a first switch T1 in which a first electrode is connected to an input terminal IN to which a second high-potential voltage DDVDH is input, a second electrode is connected to a first electrode of a third switch T3 and an anode electrode of a diode, and a gate electrode receives a first switch signal SW1, a second switch T2 which is connected in parallel to the first switch T1 and in which a first electrode is connected to the input terminal IN, a second electrode is connected to the first electrode of the third switch T3 and the anode electrode of the diode, and a gate electrode receives a second switch signal SW2, the diode D connected between the first and second switches T1 and T2 and a first node N1*b* and configured to enable a current to flow in a direction from the first and second switches T1 and T2 toward the first node N1*b*, the third switch T3 which is connected in parallel to the diode D and in which a first electrode is connected to the second electrodes of the first and second switches T1 and T2, a second electrode is connected to the first node N1*b*, and a gate electrode receives the second switch signal SW2, and a logic unit 610 configured to adjust the amount of current flowing in a direction from the input terminal IN toward a second node N1*a* by adjusting a timing for the first switch signal SW1 and the second switch signal SW2 to be output and then outputting the first switch signal SW1 and the second switch signal SW2. The logic unit 610 may be controlled by a controller 630. Further, the switch 600 may be connected to a fourth switch T4 in which a first electrode is connected to the first electrode of the third switch and a second electrode is connected to a low-potential voltage VSS so as to selectively discharge a voltage of the first node N1*b*. A gate electrode of the fourth switch T4 may receive a signal from the controller 630 and discharge the voltage of the first node N1*b*.

As for an operation of the switch 600, when a normal mode is converted into a low-power mode, the first switch T1 is turned on by the first switch signal SW1 and the second switch T2 and the third switch T3 may be turned off. In this case, the fourth switch T4 may also be turned off. When the first switch T1 is turned on by the first switch signal SW1, a path connecting the first switch T1 and the diode D in series is formed in a direction from the input terminal IN toward the first node N1*b* and a current flows through the path. The diode D may suppress a current from flowing toward the first switch T1 from a high-potential voltage line VLm to which a first high-potential voltage ELVDD is applied in a normal mode. Further, while the first switch T1 is turned on by the first switch signal SW1, if the second switch T2 and the third switch T3 are turned on by the second switch signal SW2, two paths may be formed in the direction from the input terminal IN toward the first node N1*a*. The amount of current flowing through each path may be determined by a resistance ratio between the first switch T1 and the second switch T2. If the first switch T1 and the second switch T2 have the same resistance, the currents flowing through the respective paths may be the same in amount. However, if the second switch T2 has a smaller resistance than the first switch T1, the amount of current flowing through the first switch S1 may be smaller than the amount of current flowing through the second switch T2. However, when the second switch T2 is also turned on, one more path is added to a case where only the first switch T1 is turned on. Thus, the amount of current flowing toward the first node N1*b* may be increased. Therefore, when both the first switch T1 and the second switch T2 are turned on, the amount of current flowing toward the first node N1*b* is increased and a voltage level of the first node N1*b* may reach a voltage level of the second high-potential voltage DDVDH more quickly as compared with the case where only the first switch T1 is turned on. If the first switch T1 and the second switch T1 is turned on at the same time, the third switch T3 is also turned on. Thus, a current flowing through the first switch T1 and the second switch T2 may further flow through the diode D and the third switch T3. Therefore, a current can flow more smoothly from the input terminal IN toward the first node N1*b*.

Accordingly, if only the first switch T1 is turned on, the second high-potential voltage DDVDH is applied to the high-potential voltage line VLm connected to the first node N1*b*, so that the voltage level of the high-potential voltage line VLm reaches the voltage level of the second high-potential voltage DDVDH from a voltage level of a first high-potential voltage ELVDD. If the voltage level of the high-potential voltage line VLm does not become lower than the voltage level of the second high-potential voltage DDVDH, only the first switch T1 may be allowed to be turned on, so that a conversion time of converting the first high-potential voltage ELVDD supplied to the high-potential voltage line VLm into the second high-potential voltage DDVDH can be increased. However, if the conversion time is increased too much, the voltage level of the high-potential voltage line VLm may become lower than the voltage level of the second high-potential voltage DDVDH. Further, the conversion time of converting the first high-potential voltage ELVDD supplied to the high-potential voltage line VLm into the second high-potential voltage DDVDH can be further decreased by adjusting a timing for the second switch T2 to be turned on while the first switch T1 is turned on in order to decrease the conversion time of converting the first high-potential voltage ELVDD supplied to the high-potential voltage line VLm into the second high-potential voltage DDVDH. Thus, it is possible to suppress the voltage level of the high-potential voltage line VLm from being lower than the voltage level of the second high-potential voltage DDVDH. Furthermore, a resistance corresponding to the second switch T2 may be set to be greater than a resistance corresponding to the first switch T1, so that a change in amount of current flowing from the input terminal IN toward the first node Nib may be further increased.

Also, the fourth switch T4 may be connected between the first node Nib and the low-potential voltage VSS, and if it is turned on, the fourth switch T4 may discharge a voltage of the first node Nib. Herein, the first to third switches T1 to T3 are illustrated as P-MOS transistors and the fourth switch T4 is illustrated as an N-MOS transistor, but they are not limited thereto.

Figure 7:
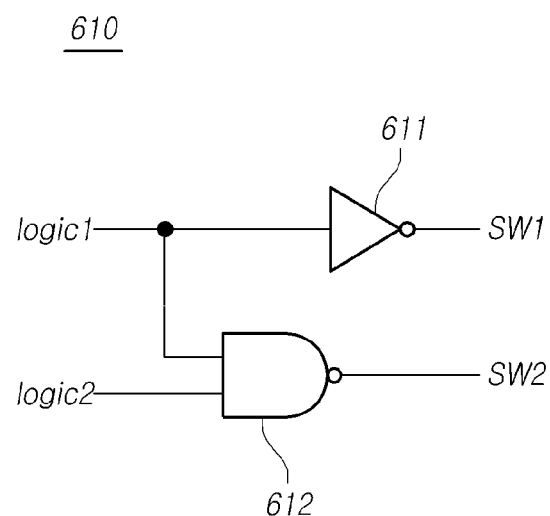
FIG. 7 is a circuit diagram illustrating an exemplary embodiment of a logic unit illustrated in FIG. 6 according to the present exemplary embodiment.

FIG. 7 is a circuit diagram illustrating an exemplary embodiment of a logic unit illustrated in FIG. 6 according to one exemplary embodiment.

Referring to FIG. 7, the logic unit 610 may include an inverter 611 configured to invert a first logic signal logic1 and output a first switch signal SW1 and a NAND gate 612 configured to perform NAND calculation to the first logic signal logic1 and a second logic signal logic2 and output a second switch signal SW2.

Firstly, if a normal mode is converted into a low-power mode, the logic unit 610 may receive the first logic signal logic1 corresponding to "1" and the second logic signal logic2 corresponding to "0". The inverter 611 inverts the first logic signal logic1 from among the first logic signal logic1 and the second logic signal logic2 and output the first switch signal SW1 so as to correspond to "0". If the first switch signal SW1 becomes "0", the first switch T1 illustrated in FIG. 6 may be turned on. However, since the second logic signal logic2 corresponds to "0", the NAND gate 612 may output the second switch signal SW2 corresponding to "1". Thus, the second switch T2 and the third switch T3 illustrated in FIG. 6 may be turned off. Further, if it is determined that it is necessary to decrease a length of a conversion time while the NAND gate 612 receives the first logic signal logic1 corresponding to "1", the logic unit 610 may receive the second logic signal logic2 corresponding to "1". When the logic unit 610 receives the second logic signal logic2 corresponding to "1", the NAND gate 612 may perform NAND calculation and output the second switch signal SW2 corresponding to "0". Thus, while the first switch T1 is turned on, the second switch T2 and the third switch T3 may be turned on.

FIG. 8 is a timing chart illustrating that a voltage level of a high-potential voltage is changed by an operation of the switch illustrated in FIG. 6 according to one exemplary embodiment.

Referring to FIG. 8, when the display device is in a low-power mode, the power supply unit 220 illustrated in FIG. 2 is disabled and the first switch signal SW1 is changed from a high state to a low state, so that the first switch T1 is turned on. Thus, the first high-potential voltage ELVDD is not transferred to the high-potential voltage line VLm connected to the first node N1$b$ and a current flows to the first node N1$b$ by the second high-potential voltage DDVDH. Accordingly, a voltage of the first node N1$b$ starts to decrease. Further, while the first switch T1 is maintained in an ON state, the second switch signal SW2 is changed from a high state to a low state, so that the second switch T2 is also turned on. Thus, the amount of current flowing by the second high-potential voltage is increased and a decrement in voltage of the first node N1$b$ is further increased. Further, if the first switch T1 and the second switch T2 are turned on and a predetermined period of time lapses, a voltage of the first node N1$b$ can be maintained at a voltage level of the second high-potential voltage DDVDH. In this case, a resistance value of the first switch T1 is greater than that of the second switch T2, and, thus, the amount of current flowing toward the first node N1$b$ is small due to a current flowing toward the first switch T1. Therefore, the slope representing a change in voltage with respect to the conversion time Tt is low. However, if both the first switch T1 and the second switch T2 are turned on, a resistance of the second switch T2 is smaller than that of the first switch T1. Thus, if the second switch T2 is turned on, the amount of current flowing therethrough can be sharply increased and the slope representing a change in voltage with respect to the conversion time Tt may be high. Therefore, the conversion time Tt can be decreased.

Further, in order to convert the low-power mode into the normal mode, while the first switch T1 and the second switch T2 are turned on, the second switch signal SW2 may be converted into a high state to turn off the second switch T2 and then the first switch signal SW1 may also be converted into a high state to turn off the first switch T1. Furthermore, the power supply unit is enabled in the normal mode so as to output the first high-potential voltage. In this case, the conversion time Tt may be changed by adjusting a timing for a first control signal and a second control signal to become low signals.

Figure 9A:
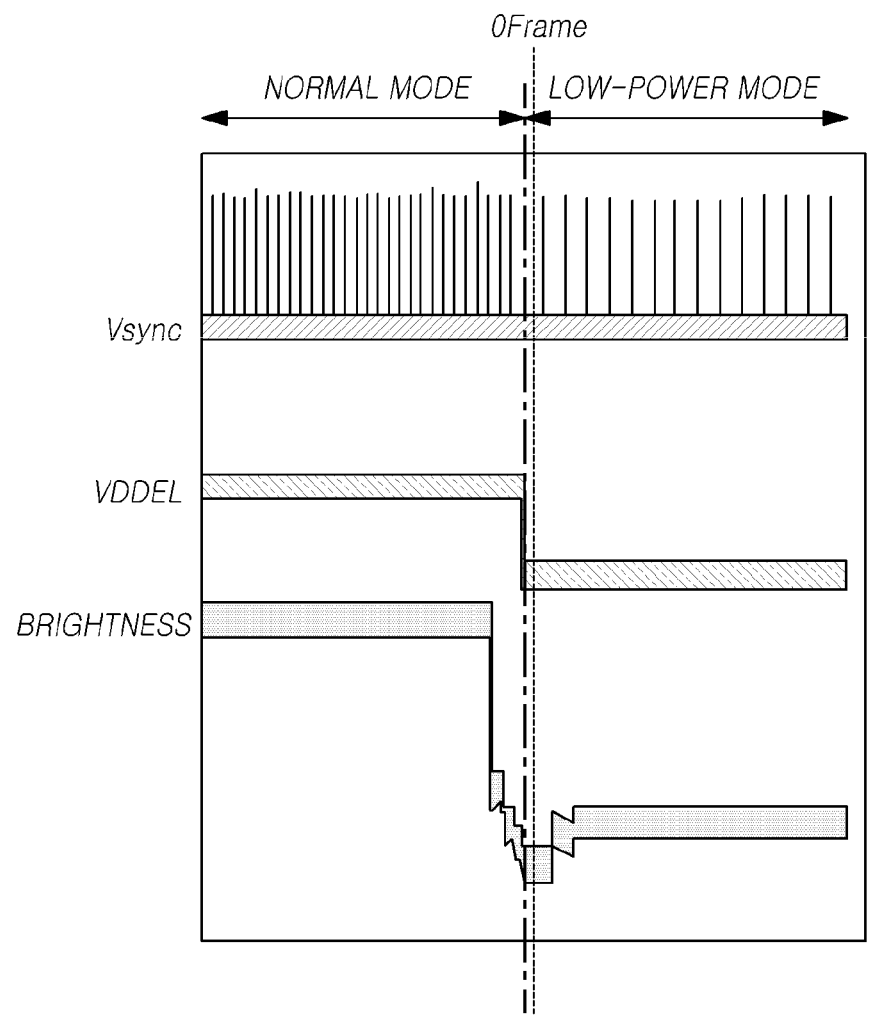
FIG. 9A is a graph illustrating a case where a length of a conversion time of converting a normal mode into a low-power mode corresponds to 0 frame according to the present exemplary embodiment.
Figure 9B:
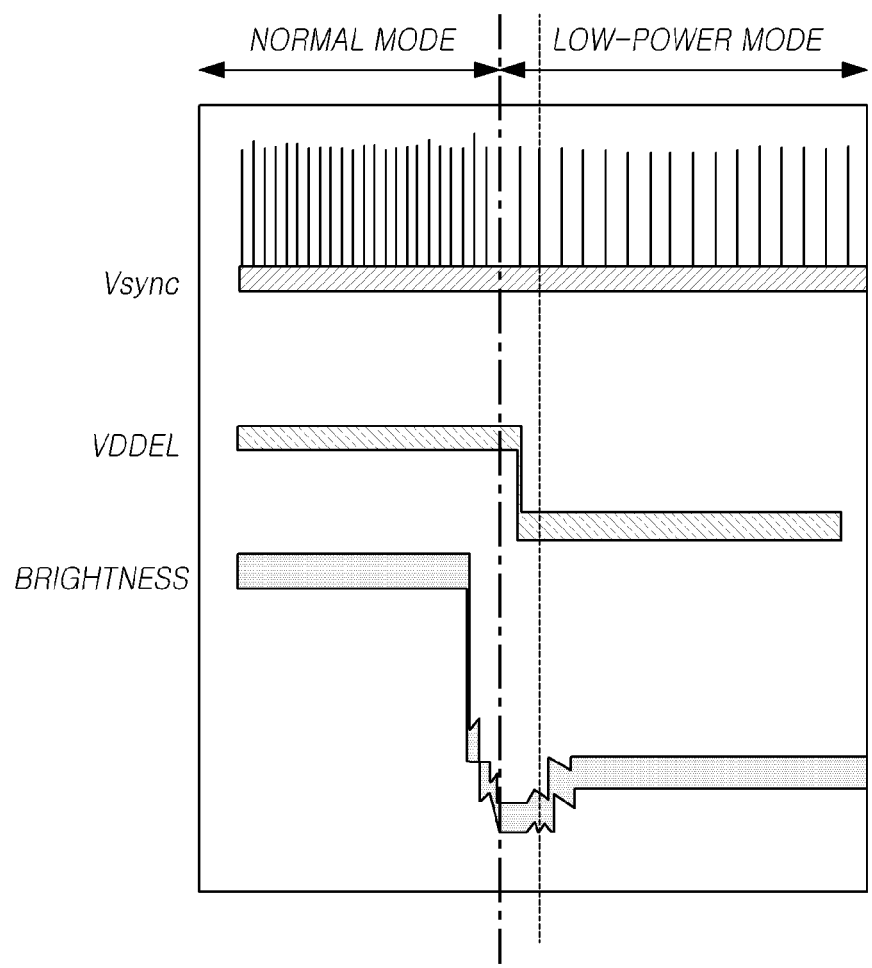
FIG. 9B is a graph illustrating a case where a length of a conversion time of converting a normal mode into a low-power mode corresponds to 2 frames according to the present exemplary embodiment.
Figure 9C:
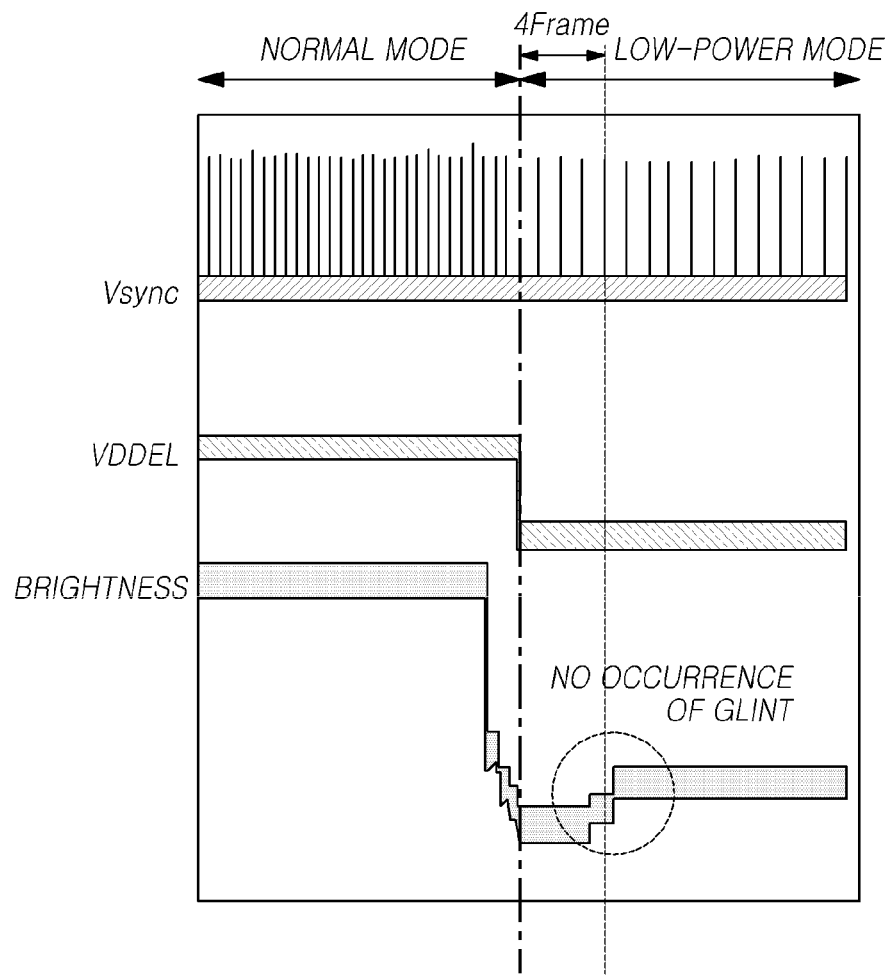
FIG. 9C is a graph illustrating a case where a length of a conversion time of converting a normal mode into a low-power mode corresponds to 4 frames according to the present exemplary embodiment.
Figure 9D:
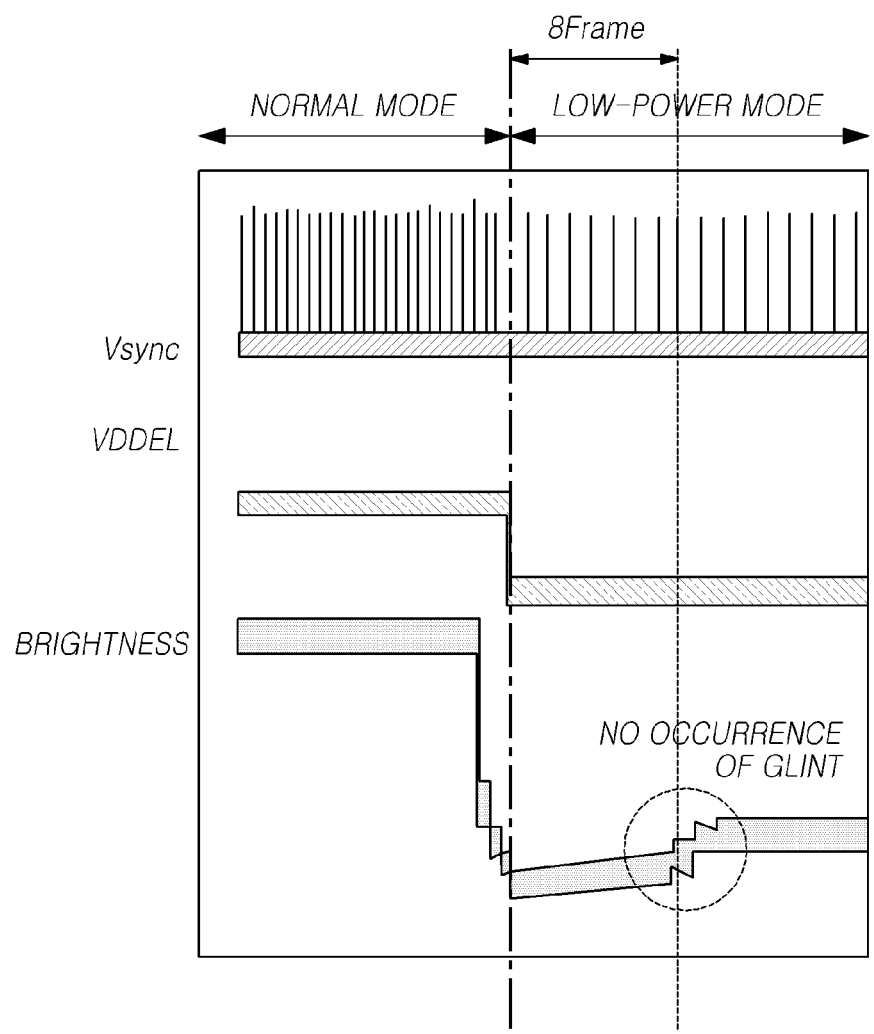
FIG. 9D is a graph illustrating a case where a length of a conversion time of converting a normal mode into a low-power mode corresponds to 8 frames according to the present exemplary embodiment.

FIG. 9A is a graph illustrating a case where a length of a conversion time of converting a normal mode into a low-power mode corresponds to 0 frame. FIG. 9B is a graph illustrating a case where a length of a conversion time of converting a normal mode into a low-power mode corresponds to 2 frames. FIG. 9C is a graph illustrating a case where a length of a conversion time of converting a normal mode into a low-power mode corresponds to 4 frames. FIG. 9D is a graph illustrating a case where a length of a conversion time of converting a normal mode into a low-power mode corresponds to 8 frames.

Herein, a signal illustrated first from the top is a vertical synchronization signal Vsync, and a second signal from the top is a voltage level of a high-potential voltage line applied to the high-potential voltage line and it represents a voltage level of a first high-potential voltage in a normal mode and a voltage level of a second high-potential voltage in a low-power mode. Further, a third signal from the top is a signal indicating the brightness of a display panel measured from a photodiode.

Referring to FIG. 9A, a normal mode is immediately converted into a low-power mode, and, thus, a voltage applied to the high-potential voltage line is converted from the voltage level of the first high-potential voltage into the voltage level of the second high-potential voltage. Therefore, the brightness of the display panel measured from the photodiode is increased at a moment of conversion from the voltage level of the first high-potential voltage into the voltage level of the second high-potential voltage, and, thus, a glint cannot be detected. It can also be seen from FIG. 9B, FIG. 9C, and FIG. 9D that an increase does not particularly appear at the moment of conversion from the voltage level of the first high-potential voltage into the voltage level of the second high-potential voltage. That is, even if the moment of conversion from the voltage level of the first high-potential voltage into the voltage level of the second high-potential voltage is delayed, the brightness is increased, and, thus, a glint is not detected. Therefore, even if the brightness is slowly changed when the normal mode is converted into the low-power mode, a glint does not appear during the conversion. Thus, the brightness of the display panel can be changed more naturally.

Figure 10:
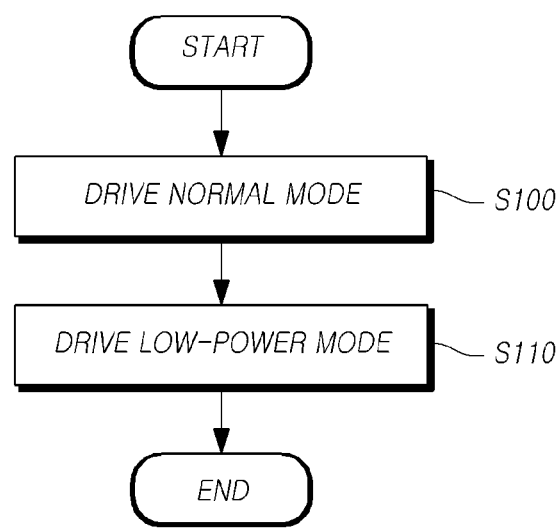
FIG. 10 is a flowchart illustrating an operation of the display device illustrated in FIG. 2 according to the present exemplary embodiment.

FIG. 10 is a flowchart illustrating an operation of the display device illustrated in FIG. 2 according to one exemplary embodiment.

Referring to FIG. 10, the display device can be selectively driven in a normal mode and a low-power mode. To this end, the display device may transfer voltages with different intensities selectively for the normal mode and the low-power mode to high-potential voltage lines of the display panel, and a driving method of the display device may include transferring a first high-potential voltage in the normal mode to the high-potential voltage lines (S100), and converting a voltage applied to the high-potential voltage lines of the display panel from the first high-potential voltage into a second high-potential voltage by blocking the first high-potential voltage and transferring the second high-potential voltage to the high-potential voltage lines in the low-power mode, and changing a time for the voltage level applied to the high-potential voltage lines to reach from a voltage level of the first high-potential voltage to a voltage level of the second high-potential voltage by adjusting a length of a conversion time of converting the first high-potential voltage into the second high-potential voltage (S110). Herein, in the changing of a time for the voltage level to reach the voltage level of the second high-potential voltage (S110), the length of the conversion time can be adjusted by adjusting the amount of current generated by the second high-potential voltage and flowing from the panel driving circuit to the high-potential voltage line. Thus, the brightness displayed on the display device 100 can be changed naturally, so that is possible to suppress display of an abnormal image when the normal mode is converted into the low-power mode.

The foregoing description and the accompanying drawings are provided only to illustrate the technical conception of the present invention, but it will be understood by a person having ordinary skill in the art that various modifications and changes such as combinations, separations, substitutions, and alterations of the components may be made without departing from the scope of the present invention. Therefore, the exemplary embodiments of the present invention are provided for illustrative purposes only but not intended to limit the technical concept of the present invention. The scope of the technical concept of the present invention is not limited thereto. Therefore, it should be understood that the above-described exemplary embodiments are illustrative in all aspects and do not limit the present invention. The protective scope of the present invention should be construed based on the following claims, and all the technical concepts in the equivalent scope thereof should be construed as falling within the scope of the present invention.

What is claimed is:

1. A display device comprising:
   a display panel including a plurality of gate lines, a plurality of high-potential voltage lines, and a plurality of pixels, each of the plurality of pixels supplied with a gate signal via a corresponding one of the plurality of gate lines that is connected to the pixel, and each of the plurality of pixels supplied with a high-potential voltage that powers the pixel via a corresponding one of the plurality of high-potential voltage lines that is connected to the pixel;
   a power supply unit connected to the plurality of high-potential voltage lines, the power supply unit enabled in a normal mode and the power supply unit supplying a first high-potential voltage for powering the pixels to the plurality of high-potential voltage lines during the normal mode, and the power supply unit disabled in a low-power mode and the power supply unit not providing the first high-potential voltage to the plurality of high-potential voltage lines during the low-power mode; and
   a panel driving circuit that disables the power supply unit in response to the low-power mode, the panel driving circuit adjusting a length of time required for a voltage level applied to the plurality of high-potential voltage lines to transition from the first high-potential voltage applied during the normal mode to a second high-potential voltage that is applied to the pixels to power the pixels during the low-power mode, the second high-potential voltage less than the first high-potential voltage,
   wherein the panel driving circuit adjusts an amount of current generated by the second high-potential voltage by controlling a number of paths through which the current is transmitted and the current is flowing from the panel driving circuit to the high-potential voltage lines,
   wherein the panel driving circuit includes a switch that selects at least one path from a plurality of paths that are connected to the plurality of high-potential voltage lines, the selected path adjusting an amount of current supplied to the plurality of high-potential voltage lines,
   wherein the switch includes a first switch, a second switch, a third switch, a diode, and a logic unit that outputs a first switch signal that controls an on-state of the first switch and the logic unit outputs a second switch signal that controls an on-state of the second switch,
   wherein the first switch comprises a first electrode, a second electrode, and a gate electrode, the first electrode of the first switch connected to the second high-potential voltage, the second electrode of the first switch connected to both a first electrode of the third switch and an anode electrode of the diode, and the gate electrode of the first switch connected to the first switch signal,
   wherein the second switch is connected in parallel with the first switch, and the second switch comprises a first electrode, a second electrode, and a gate electrode, the first electrode of the second switch connected to the second high-potential voltage, the second electrode of the second switch connected to both the first electrode of the third switch and the anode electrode of the diode, and a gate electrode of the second switch is connected to the second switch signal,
   wherein the diode comprises the anode electrode and a cathode electrode, the anode electrode of the diode is connected to the second electrode of the first switch and the second electrode of the second switch, and wherein the cathode electrode is connected to a second electrode of the third switch,
   wherein the third switch is connected in parallel to the diode, and wherein the first electrode of the third switch is connected to the second electrode of the first switch and the second electrode of the second switch, the second electrode of the third switch is connected to the cathode of the diode, and a gate electrode of the third switch is connected to the second switch signal, and
   wherein the logic unit adjusts a transition from the first current to the second current by adjusting a timing for outputting the first switch signal and the second switch signal and respectively outputting the first switch signal and the second switch signal to the first switch and the second switch according to the adjusted timing.

2. The display device according to claim 1, wherein the switch includes:
   a first switch that is turned on responsive to the first switch receiving a first switch signal, the first switch supplying the second high-potential voltage and a first current to the plurality of high-potential voltage lines;
   a second switch that is turned on responsive to the second switch receiving a second switch signal, the second switch supplying the second high-potential voltage and a second current that is larger than the first current to the high-potential voltage lines; and
   a logic unit that adjusts a transition from the first current to the second current by adjusting a timing for outputting the first switch signal and the second switch signal and respectively outputting the first switch signal and the second switch signal to the first switch and the second switch according to the adjusted timing.

3. The display device according to claim 2, wherein a resistance corresponding to the first switch is greater than a resistance corresponding to the second switch.

4. The display device according to claim 1, wherein the logic unit includes:
   an inverter that inverts a first logic signal received by the inverter and the inverter outputs the first switch signal; and
   a NAND gate that performs a logical NAND calculation to the first logic signal and a second logic signal received by the NAND gate, and the NAND gate outputs the second switch signal.

5. The display device according to claim 1, wherein a resistance corresponding to the first switch is greater than a resistance corresponding to the second switch.

6. The display device according to claim 1, wherein a period of one frame of the display device in the normal mode is shorter than a period of one frame of the display device in the low-power mode.

7. The display device according to claim 1, wherein the voltage level of the first high-potential voltage is higher than that of the second high-potential voltage.

8. A display device comprising:
a display panel including a plurality of gate lines, a plurality of high-potential voltage lines, and a plurality of pixels, each of the plurality of pixels supplied with a gate signal via a corresponding one of the plurality of gate lines that is connected to the pixel, and each of the plurality of pixels supplied with a high-potential voltage that powers the pixel via a corresponding one of the plurality of high-potential voltage lines that is connected to the pixel;
a power supply unit connected to the plurality of high-potential voltage lines, the power supply unit enabled in a normal mode and the power supply unit supplying a first high-potential voltage for powering the pixels to the plurality of high-potential voltage lines during the normal mode, and the power supply unit disabled in a low-power mode and the power supply unit not providing the first high-potential voltage to the plurality of high-potential voltage lines during the low-power mode; and
a panel driving circuit that disables the power supply unit in response to the low-power mode, the panel driving circuit establishing a predetermined change of brightness of the display device when transitioning from the normal mode to the low power mode, and the panel driving circuit adjusting a length of time required for a brightness level in the normal mode to transition to a brightness level in the low power mode according to the predetermined changed of brightness,
wherein the panel driving circuit adjusts the length of time by disabling the power supply unit in the low-power mode and adjusts an amount of current generated by a second high-potential voltage and flowing from the panel driving circuit to the high-potential voltage lines,
wherein the panel driving circuit includes a switch that selects at least one path from a plurality of paths that are connected to the plurality of high-potential voltage lines, the selected path adjusting an amount of current supplied to the plurality of high-potential voltage lines,
wherein the switch includes a first switch, a second switch, a third switch, a diode, and a logic unit that outputs a first switch signal that controls an on-state of the first switch and the logic unit outputs a second switch signal that controls an on-state of the second switch and the third switch,
wherein the first switch comprises a first electrode, a second electrode, and a gate electrode, the first electrode of the first switch connected to the second high-potential voltage, the second electrode of the first switch connected to both a first electrode of the third switch and an anode electrode of the diode, and the gate electrode of the first switch connected to the first switch signal,
wherein the second switch is connected in parallel with the first switch, and the second switch comprises a first electrode, a second electrode, and a gate electrode, the first electrode of the second switch connected to the second high-potential voltage, the second electrode of the second switch connected to both the first electrode of the third switch and the anode electrode of the diode, and a gate electrode of the second switch connected to the second switch signal,
wherein the diode comprises the anode electrode and a cathode electrode, the anode electrode of the diode is connected to the second electrode of the first switch and the second electrode of the second switch, and wherein the cathode electrode is connected to a second electrode of the third switch,
wherein the third switch is connected in parallel to the diode, and wherein the first electrode of the third switch is connected to the second electrode of the first switch and the second electrode of the second switch, the second electrode of the third switch is connected to the cathode of the diode, and a gate electrode of the third switch is connected to the second switch signal, and
wherein the logic unit adjusts a transition from the first current to the second current by adjusting a timing for outputting the first switch signal and the second switch signal and respectively outputting the first switch signal and the second switch signal to the first switch and the second switch according to the adjusted timing.

9. The display device according to claim 8, wherein the switch includes:
a first switch that is turned on responsive to the first switch receiving a first switch signal and the first switch supplies the second high-potential voltage and a first current to the plurality of high-potential voltage lines;
a second switch that is turned on responsive to the second switch receiving a second switch signal and the second switch supplies the second high-potential voltage and a second that is larger than the first current to the high-potential voltage lines; and
a logic unit that adjusts a transition from the first current to the second current by adjusting a timing for outputting the first switch signal and the second switch signal and respectively outputting the first switch signal and the second switch signal to the first switch and the second switch according to the adjusted timing.

10. The display device according to claim 8, wherein the logic unit includes:
an inverter that inverts a first logic signal received by the inverter and the inverter outputs the first switch signal; and
a NAND gate that performs a logical NAND calculation to the first logic signal and a second logic signal received by the NAND gate, and the NAND gate outputs the second switch signal.

11. The display device according to claim 10, wherein a resistance corresponding to the first switch is greater than a resistance corresponding to the second switch.

12. The display device according to claim 8, wherein a resistance corresponding to the first switch is greater than a resistance corresponding to the second switch.

13. The display device according to claim 8, wherein a period of one frame of the display device in the normal mode is shorter than a period of one frame of the display device in the low-power mode.

* * * * *